United States Patent [19]

Kok

[11] 4,240,981

[45] Dec. 23, 1980

[54] PROCESS FOR THE PREPARATION OF 1,2-DIOXIMES

[75] Inventor: Riekert Kok, Amsterdam, Netherlands

[73] Assignee: Shell Oil Company, Houston, Tex.

[21] Appl. No.: 18,386

[22] Filed: Mar. 7, 1979

[30] Foreign Application Priority Data

Mar. 8, 1978 [GB] United Kingdom .............. 9210/78

[51] Int. Cl.$^3$ ........................................... C07C 131/00
[52] U.S. Cl. ......................... 564/259; 423/DIG. 14; 260/439 R
[58] Field of Search .................... 260/566 A

[56] References Cited

U.S. PATENT DOCUMENTS

| | | | |
|---|---|---|---|
| 3,462,488 | 8/1969 | McBee et al. | 260/566 A |
| 3,579,556 | 5/1971 | Briggs et al. | 260/566 A |
| 3,703,573 | 11/1972 | Blytas | 260/566 A |
| 3,725,477 | 4/1973 | Olechowski | 260/566 A |

OTHER PUBLICATIONS

Banks, Charles V., "The Chemistry of the vic-Dioximes", *Record of Chemical Progress*, vol. 25, No. 2 (1964) pp. 85–103.

*Primary Examiner*—Joseph E. Evans
*Assistant Examiner*—Leah Hendriksen

[57] ABSTRACT

The invention relates to a process for the preparation of a 1,2-dioxime of the general formula A—C(=NOH)—C(=NOH)—R, wherein A represents an aromatic group and R a hydrocarbyl group or a hydrogen atom, which process comprises the reaction of hydroxylamine with one or more hydroxyiminoketones of formula A—C(=O)—C(=NOH)—R or of formula A—C(=NOH)—C(=NOH)—R in the presence of a nickel compound forming a complex with the 1,2-dioxime.

14 Claims, No Drawings

PROCESS FOR THE PREPARATION OF 1,2-DIOXIMES

BACKGROUND OF THE INVENTION

The invention relates to a process for the preparation of 1,2-dioximes of the general formula A—C(=NOH)—C(=NOR)—R wherein A represents an aromatic group and R a hydrocarbyl group or a hydrogen atom.

Vic-dioximes, including the 1,2-dioximes of the above formula, are widely known materials. Because of their recognized ability to form chelate complexes with certain metal ions, these dioximes have utility as reagents for use in the quantitative analysis of metals and as extraction agents in liquid/liquid extraction processes for the recovery of metals in the course of mining operations.

It is known that 1,2-dioximes of formula A—C(=NOH)—C(=NOH)—may be prepared from hydroxyiminoketones of the formula A—C(=O)—C(=NOH)—R or the formula A—C(=NOH)—C(=O)—R, wherein A and R are as heretofore defined, by reaction with hydroxylamine. Synthesis of vic-dioximes in this general manner is disclosed, for example, in Methoden der organishen Chemie, Houben-Weyl, Vol. X/4 (1968), p. 61-64, and by C. V. Banks in Record of Chemical Progress, Vol. 25, No. 2 (1964), p. 85.

Methoden der organishen Chemie further teaches, at pages 282-294 of Vol. X/4, that vic-dioximes exist in the anti, the syn, and two amphi configurations, which may be represented as follows:

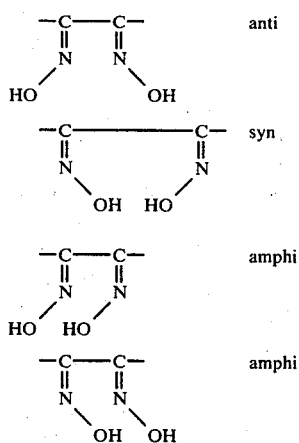

It is generally known that these configurations exhibit different physical and chemical properties. In this regard, the commonly-assigned copending application having Ser. No. 016,679, filed Mar. 1, 1979, which is a continuation of application Ser. No. 884,054, filed Mar. 6, 1978, now abandoned, and the copending continuation thereof, Ser. No. 16,679, filed Mar. 1, 1979, disclose that the anti form of certain 1,2-dioximes out-performs the syn and amphi configurations when used as the active chelating agent in a liquid/liquid extraction process for the recovery of nickel from aqueous solution. Another commonly-assigned copending application, Ser. No. 884,337, filed Mar. 7, 1978, now U.S. Pat. No. 4,173,616, discloses that hydroxyoxime extractant mixtures comprising the anti configuration of various dioximes exhibit synergistic performance in accomplishing the extraction of copper, while mixtures comprising the syn and amphi configurations do not.

In view of recognition in the art of the advantageous properties of the anti isomer of 1,2-dioximes, a process for the preparation of 1,2-dioximes which maximizes production of the anti isomer and minimizes production of the syn and amphi isomers would be highly desirable. However, conventional preparation of a 1,2-dioxime by reaction of the corresponding hydroxyiminoketone with hydroxylamine has resulted in a product containing a relatively low proportion of the anti configuration.

SUMMARY OF THE INVENTION

It has now been found that the known reaction of hydroxylamine with hydroxyiminoketones to yield 1,2-dioximes can be carried out in an improved manner. According to the invention, a hydroxyiminoketone represented by the formula A—C(=O)—C(=NOH)—R or by the formula A—C(=NOH)—C(=O)—R, wherein A is an aromatic group and R is a hydrocarbyl group or a hydrogen atom, is reacted with hydroxylamine in the presence of a nickel compound to yield 1,2-dioxime of the formula A—C(=NOH)—C(=NOH)—R. The product of this process is characterized by a higher proportion of dioxime anti isomer than conventional oximation processes carried out in the absence of a nickel compound in the reaction mixture. Moreover, the oximation process of the invention is found to give high conversion of hydroxyiminoketone to 1,2-dioxime at a more rapid overall reaction rate than does the conventional preparation process.

DESCRIPTION OF THE PREFERRED EMBODIMENTS

The invention is viewed as providing improvement upon the known process for reacting hydroxylamine with a hydroxyiminoketone to yield the corresponding 1,2-dioxime. The improvement associated with the invention is, to a great extent, provided very simply by the presence in the hydroxyiminoketone/hydroxylamine oximation reaction mixture of a nickel compound, which presence is responsible for a beneficial increase in formation of the anti isomer of the corresponding 1,2-dioxime reaction product and concomitant decrease in the formation of the syn and amphi isomers. Other preferred process features, as will hereinafter be identified, have been found to aid in, but not to be critical to, accomplishing this beneficial result. As a general rule, however, apart from the presence in the reaction mixture of a nickel compound, the dioxime preparation process of the invention may be very suitably carried out according to oximation procedures well known in the art. Reaction temperatures, and pressures, relative proportions of reactants, the use of reaction solvents, and like aspects of conventional processes for the preparation of 1,2-dioximes from hydroxyiminoketones through reaction with hydroxylamine are suitable for use in the process of the invention.

Hydroxyiminoketones suitable for use in the process of the invention are those of the formula A—C(=NOH)—C(=O)—R or the formula A—C(=O)—C(=NOH)—R, wherein A is an aromatic group and R a hydrocarbyl group or a hydrogen atom. Preferably, the hydroxyiminoketone is itself substantially in the anti configuration, which is defined as that in which the hydroxyl group of the oxime substituent is turned away from the oxygen atom of the carbonyl group. It is also preferred for purposes of the invention that the hydroxyiminoketone be substantially of the structure represented by the formula A—C(=O)—C(=NOH)—R.

The particular nature of substituents A and R in the two suitable hydroxyiminoketone structural formulas noted above has not been found to be critical to the performance of the process of the invention. For reasons relating to the recognized utility of the anti isomer certain 1,2-dioxime compounds, it is preferred, however, that the group represented by A be a phenyl group substituted with at least one organic substituent $R^1$, which is preferably an alkyl group having less than 25 carbon atoms and which is connected to the phenyl ring at the number 4 position, the number 1 position being assigned to the ring carbon atom to which the —C(=O)—C(=NOH)—R or —C(=NOH)—C(=O)—R group is attached. While the $R^1$ group is suitably of a straight chain structure, it is most preferably branched. For like reasons, the hydrocarbyl group R preferably represents an alkyl group with less than 20, and most preferably one with between 5 and 10, carbon atoms.

Hydroxyiminoketones suitable for use in the process of the invention are known in the art and can be prepared by recognized synthesis techniques. As an illustration of one method for preparation of such compounds, the anti configuration of the hydroxyiminoketone of formula A—C(=O)—C(=NOH)—R can be obtained by reacting an alkyl nitrite with a compound of the general formula A—C(=O)—CH₂—R, which has, in turn, been prepared by reacting an aromatic compound corresponding to the A group with an acyl halide of the general formula X—C(=O)—CH₂—R, wherein X represents a halogen atom, preferably a chlorine or bromine atom.

If desired, the hydroxyiminoketone employed as starting material in the process of the invention may be formed in situ in the oximation reaction mixture. For instance, a 1,2-diketone of the general formula A—C(=O)—C(=O)—R can be added to the reaction mixture in place of the hydroxyiminoketone. The diketone reacts with a portion of the hydroxylamine present to yield a hydroxyiminoketone which in turn reacts with additional hydroxylamine according to the invention.

The hydroxylamine reactant may be supplied to the oximation reaction either in the form of hydroxylamine or has a hydroxylamine derivative which will release hydroxylamine under the reaction conditions. Derivative compounds, particularly hydroxylammonium salts, are a preferred source of hydroxylamine for conventional oximation reactions and for the process of the invention as they are readily available. Because of its inherent instability, hydroxylamine is generally transported and stored only in the form of such derivative compounds. Most preferably, the hydroxylamine reactant in the process of the invention is introduced into the oximation reaction as a salt of a strong acid, for example a salt of hydrochloric, sulfuric, or p-toluenesulfonic acid. Salts of weak acids, for example, hydroxylammonium acetate, can also be suitably utilized, however. It is to be understood that the recitation of a hydroxylamine reactant in the context of the invention is meant to encompass both free hydroxylamine and suitable derivative compounds.

The presence of a nickel compound in the oximation reaction mixture is critical to the process of the invention. While oximation of a hydroxyiminoketone with hydroxylamine may be considered conventional, known oximation processes are not characterized by the presence of nickel or other metal compounds in the reaction mixture. The nickel compound is suitably one which forms a chelate complex with the 1,2-dioxime product of the oximation reaction under the conditions at which the reaction is carried out. As a general rule, essentially all nickel compounds are capable of providing for the formation of nickel/dioxime chelate complexes, as evidenced by long known and widely used processes for the quantitative determination of nickel through extraction with various dioximes. Suitable inorganic nickel compounds include the halides, sulfate, hydroxides, oxides, nitrate, nitride, sulfide, sulfamate, ammonium sulfate, fluoborate, cyanide, carbonate, and perchlorate compounds. Organic compounds such as nickelocene, compounds derived from the reaction of nickel with organic acids, (e.g. acetic, propionic, octanoic, formic, naphthenic, oxalic, stearic acids and the like), and those produced through reaction of nickel with organic molecules of basic character (e.g. ethers, thioethers, and trivalent nitrogen, phosphorous or arsenic compounds) are also generally acceptable for use in the process of the invention. Complex nickel compounds, such as an amminenickel complex, may also be used. The nickel compound may be one which is soluble in the reaction mixture, or, alternatively, one such as nickel hydroxide or nickel carbonate which will be present in suspension in most common oximation reaction mixtures. Most preferably, the process of the invention is practiced with a nickel compound having an oxidation state of 2, i.e. a Ni(II) compound.

As a general rule it has been observed that, when such a nickel compound is not present in the reaction between a hydroxyiminoketone and hydroxylamine, the oximation first proceeds with preferential formation of the anti configuration of the 1,2-dioxime. However, after a certain yield of the anti configuration, say x%, has been obtained, the remainder of the hydroxyiminoketone is converted almost exclusively into the syn and amphi dioxime isomers. When a small quantity of a nickel compound capable of forming a complex with the 1,2-dioxime is present in the oximation reaction mixture, the preferential conversion of hydroxyiminoketone to the anti isomer of the dioxime continues until a certain yield of the isomer, say y% has been achieved, where y is greater than x. The remainder of the hydroxyiminoketone then reacts to give syn and amphi isomers. The difference between y and x increases with increasing molar ratio of nickel to hydroxyiminoketone in the starting reaction mixture, so long as the molar ratio is below 0.5. When this molar ratio is approximately 0.5, the anti configuration is preferentially formed until essentially all of the hydroxyiminoketone has been converted into 1,2-dioxime. Further additions of nickel, to raise the molar ratio above about 0.5, generally do not result in increasing the conversion of the dioxime. It is believed that the significance of this 0.5 mole ratio is explained by the commonly accepted theory that complexes of nickel with dioximes comprise one nickel molecule and two dioxime molecules. In any event, the nickel compound is most preferably present in the oximation mixture for purposes of the process of the invention in a quantity such that the molar ratio of nickel to hydroxyiminoketone is approximately 0.5. However, greater quantities of nickel, for example, up to a molar ratio of 2.0, do not appear to detract from the beneficial performance of lesser quantities, and, although such greater quantities do not appreciably increase ultimate yield of the dioxime, they may result in an increase in the rate of the oximation reaction. Furthermore, lesser quantities of nickel, for example, in molar ratio of 0.1, are responsible for noticeable increase in the production of the anti dioxime isomer over conventional practice.

Under both conventional practice and the process of the invention, the reaction between hydroxylamine and a hydroxyiminoketone is preferably carried out in the presence of a suitable solvent and a base other than hydroxylamine. Very suitably, the solvent may be a lower alkanol, e.g., a $C_1$ to $C_4$ alkanol, or a mixture of a lower alkanol with water, or a hydrocarbon, e.g., heptane, octane, nonane, decane toluene, or xylene, or a mixture of hydrocarbons, such as a gasoline fraction boiling between 80° C. and 110° C.

Oximation according to the process of the invention is preferably carried out in the presence of a strong base, i.e., one stronger than the hydroxylamine reactant, as this is generally known to increase oximation reaction rate and also has been found to enhance formation of the 1,2-dioxime anti isomer. The presence of such a base is particularly important when the hydroxylamine is introduced in salt form, in which case the base functions to free hydroxylamine from the salt. Suitable bases include alkali metal hydroxides, alkaline earth metal hydroxides, alkylamines, and ammonia. Ammonia and the alkali metal hydroxides, particularly sodium hydroxide, are most preferred for practice of the process of the invention as their presence in the oximation mixture is found to result in relatively higher proportions of the anti isomer. If desired, salts of strong bases and weak acids, for example, alkali metal acetates, propionates or carbonates, can be used in place of strong bases to liberate hydroxylamine from its salt form.

As has already been noted, reaction temperature, pressure, and like variables are not critical to the improvement in 1,2-dioxime preparation afforded by the process of the invention. Reaction temperatures between about 60° and 100° C. are preferred for practice of the process of the invention, although higher and lower temperatures, for example, between 30° C. and 150° C., can also be employed. A temperature of about 80° C. is most preferred. Reaction times on the order of about one to five hours are usually required to obtain high conversion of the hydroxyiminoketone to 1,2-dioxime at this temperature.

The following examples further illustrate the preparation of 1,2-dioximes according to the process of the invention. Examples I–VII utilize as starting material a mixture of isomeric 1-(4-dodecylphenyl)-2-hydroxyimino-1-octanones having various branched dodecyl groups, hereinafter referred to simply as "2-hydroxyiminoketone", which was prepared according to the following procedures:

Alkylation of benzene with a mixture of branched dodecenes obtained by oligomerization of propene gave a mixture of isomeric dodecylbenzenes with various branched dodecyl groups. Reaction of this mixture of dodecylbenzenes with octanoyl chloride in the presence of aluminum chloride gave a mixture of isomeric 1-(4-dodecylphenyl)-1-octanones with various branched dodecyl groups.

A solution of 0.1 mol of the latter mixture in 100 ml of diethyl ether was saturated with gaseous hydrogen chloride of atmospheric pressure at a temperature between 0° and 10° C. Then 0.1 mol of isopropyl nitrite was added dropwise to the solution with stirring over a period of half an hour. After this addition stirring was continued for two hours at a temperature between 0° and 10° C. The reaction mixture thus formed was washed with two 25-ml portions of water, the diethyl ether was evaporated from the washed mixture and the residue thus obtained was poured into 150 ml of a 5 percent by weight (%w) solution of sodium hydroxide in a mixture consisting of 50 percent by volume (%v) of water and 50% v of ethanol. The solution thus obtained was extracted with two 50-ml portions of n-pentane to remove any unconverted 1-(4-dodecylphenyl)-1-octanone. An amount of 2 N aqueous sulphuric acid sufficient to decrease the pH of the extracted aqueous solution to a value of 2 was added and then the mixture was extracted with two 100-ml portions of diethyl ether. The ethereal phase was dried over anhydrous sodium sulphate and the dried ethereal phase was distilled to leave a residue having a content of 2-hydroxyiminoketone of 92%. Yield of the desired material was 98%, calculated on the starting amount of 1-(4-dodecylphenyl)-1-octanones. Essentially all of the 2-hydroxyiminoketone was in the anti configuration.

In the following Examples the conversions of the 2-hydroxyiminoketone and the yields of the configurations of the 1-(4-dodecylphenyl)-1,2-octanedione dioxime mixture were determined by means of gas-liquid chromatography and have been calculated on starting 2-hydroxyiminoketone. For convenience the 1-(4-dodecylphenyl)-1,2-octanedione dioxime will be designated "1,2-dioxime".

EXAMPLE I

This example illustrates preparation of 1,2-dioxime according to the process of the invention. Reaction between 2-hydroxyiminoketone and hydroxylamine was accomplished in the presence of a nickel compound. According to a preferred aspect of the invention, a strong base was also added to the reaction mixture.

A flask was charged with 2-hydroxyiminoketone (0.3 mol), 2-propanol (200 ml), nickel chloride hexahydrate (0.15 mol) and a 40% w aqueous solution of sodium hydroxide (containing 0.9 mol of sodium hydroxide). As the mixture thus formed was heated under reflux (80° C.), a solution of hydroxylammonium chloride (0.45 mol) in water (50 ml) was added gradually over a period of two hours. At the end of this period, 97% of the 2-hydroxyiminoketone had been converted to 1,2-dioxime. 84% of the 1,2-dioxime was present in the anti configuration.

EXAMPLE II

The dioxime preparation procedures described in Example I were repeated in the absence of nickel chloride hexahydrate, i.e., not according to the invention. At the end of the two hours in which hydroxylammonium chloride was added to the reaction mixture, the conversion of 2-hydroxyiminoketone was only 40%. In an attempt to increase this conversion, the reaction mixture was refluxed for two more hours; then additional hydroxylammonium chloride (0.45 mol) was added and stirring was continued for four hours. Conversion of 2-hydroxyiminoketone to 1,2-dioxime was determined to be 90%. Only 19% of the 1,2-dioxime was in the anti configuration.

EXAMPLE III

In this illustration of the invention, the 1,2-dioxime is prepared by reaction in the presence of ammonia and a nickel compound. Reaction in a mixture of 2-hydroxyiminoketone (0.3 mol), 2-propanol (200 ml), hydroxylammonium chloride (0.45 mol), nickel chloride hexahydrate (0.15 mol, i.e., 0.5 mol per mol of hydroxyiminoketone) and 25% w aqueous ammonia (1.05 mol ammonia) was accomplished by heating under reflux (82° C.) for 5 hours. The nickel was present in the form of an amminenickel complex. Table I presents the results found after the reaction times stated.

TABLE I

| Elapsed Reaction time, hours | Conversion of 2-hydroxy-iminoketone, % | Yield of 1,2-dioxime, % | |
|---|---|---|---|
| | | anti | amphi and syn |
| 2 | 54 | 45 | 9 |
| 3.4 | 75 | 66 | 9 |
| 4.5 | 88 | 79 | 9 |
| 5 | 92 | 83 | 9 |

Hence, after 5 hours reflux, 90% of the 1,2-dioxime formed was present in the anti configuration at a total yield of 1,2-dioxime of 92%.

EXAMPLE IV

The experimental procedures described in Example III were repeated with the exception that 0.06 instead of 0.15 mol of nickel chloride hexahydrate (i.e., 0.2 mol per mol of hydroxyiminoketone instead of 0.5) was present in the reaction mixture. Results are presented in Table II.

TABLE II

| Elapsed reaction time, hours | Conversion of 2-hydroxy-iminoketone, % | Yield of 1,2-dioxime, % | |
|---|---|---|---|
| | | anti | amphi and syn |
| 2 | 56 | 51 | 5 |
| 5 | 68 | 56 | 12 |
| 9 | 75 | 54 | 21 |

It can be seen that under conditions of this example the oximation reaction proceeds in a manner similar to that in Example III for the first two hours. However, after two hours, the reaction proceeds at a relatively slow rate and results in little addtional production of the anti 1,2-dioxime. Comparison of Examples III and IV indicates the dependence of conversion to 1,2-dioxime and selectivity to the anti configuration upon the presence of various quantities of nickel in the reaction mixture.

EXAMPLE V

The procedures of Examples III and IV were repeated in the absence of nickel chloride hexahydrate, i.e., not according to the process of the invention. Table III presents the results.

TABLE III

| Elapsed reaction time, hours | Conversion of 2-hydroxy-iminoketone, % | Yield of 1,2-dioxime, % | |
|---|---|---|---|
| | | anti | amphi and syn |
| 2 | 22 | 15 | 7 |
| 5 | 34 | 22 | 12 |
| 48 | 82 | 22 | 67 |

Comparison of the results of Example V with those of Examples III and IV further illustrates the dependence of oximation conversion and selectivity upon the addition of nickel to the reaction mixture.

EXAMPLE VI

After further prolonged refluxing of the reaction mixture of Example V, the 1,2-dioxime was eventually obtained in quantitative yield. However, selectivity to the anti configuration was still only 22%. In an attempt to increase yield of the anti form, nickel chloride hexahydrate (0.15 mol) was then added to the reaction mixture. After further refluxing for 24 hours, there was no increase in the yield of the anti configuration of the 1,2-dioxime.

EXAMPLE VII

This example illustrates preparation of 1,2-dioxime, according to the process of the invention, in a reaction mixture comprising sodium acetate and a nickel compound.

A mixture of 2-hydroxyiminoketone (0.3 mol), 2-propanol (200 ml), hydroxylammonium chloride (0.45 mol), sodium acetate trihydrate (1.2 mol) and nickel acetate tetrahydrate (0.5 mol) was heated under reflux (82° C.) for 3 hours. At the end of this period the conversion of the 2-hydroxyiminoketone to 1,2-dioxime was 97%. It was determined that about 55% of the dioxime was in the anti form.

EXAMPLE VIII

The procedures of Example VII were repeated, without the addition of nickel acetate tetrahydrate to the reaction mixture. Table IV gives the results.

TABLE IV

| Elapsed reaction time, hours | Conversion of 2-hydroxy-iminoketone, % | Yield of 1,2-dioxime, % | |
|---|---|---|---|
| | | anti | amphi and syn |
| 1 | 63 | 26 | 37 |
| 2 | 75 | 27 | 48 |
| 3 | 81 | 27 | 54 |
| 4.5 | 85 | 28 | 57 |

In comparison to the results of Example VII, it can be seen that oximation in the absence of a nickel compound proceeds at a slower rate and with a lower selectivity to the desired anti configuration of the 1,2-dioxime.

I claim as my invention:

1. In the process for the preparation of a product mixture containing anti, syn, and amphi isomers of 1,2-dioximes of the formula A—C(=NOH)—C(=NOH)—R, wherein A represents an aromatic group and R represents a hydrocarbyl group or a hydrogen atom, by reacting hydroxylamine with a hydroxyiminoketone reactant selected from the class consisting of hydroxyiminoketones of the formula A—C(=O)—C(=NOH)—R, hydroxyiminoketones of the formula A—C(=NOH)—C(=O)—R, and mixtures thereof, the improvement which comprises carrying out the reaction in the presence of a nickel compound capable of forming a chelate complex with the 1,2-dioxime, the mole ratio of said nickel compound to said hydroxyiminoketone reactant being in the range of from about 0.1 to 2.0, thereby obtaining a product mixture containing an increased proportion of the anti isomer of the dioximes.

2. The process of claim 1, wherein the molar ratio of the nickel compound to the hydroxyiminoketone reactant is in the range of from about 0.4 to 0.6.

3. The process of claim 1, wherein the reaction is carried out in the presence of a strong base.

4. The process of claim 3, wherein the strong base is selected from the class consisting of alkali metal hydroxides and ammonia.

5. The process of claim 3, wherein the hydroxyiminoketone reactant is substantially in the anti configuration.

6. The process of claim 5, wherein the hydroxyiminoketone is substantially of the formula A—C(=O)—C(=NOH)—R.

7. The process of claim 3, wherein A represents an aromatic group substituted with at least one organic group $R^1$.

8. The process of claim 7, wherein A represents a phenyl ring substituted with one or more organic groups $R^1$ having a total number of carbon atoms less than 25.

9. The process of claim 8, wherein A is represented by the formula

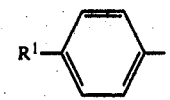

10. The process of claim 9, wherein $R^1$ represents an alkyl group having between about 7 and 20 carbon atoms.

11. The process of claim 8, wherein R represents an alkyl group having less than 20 carbon atoms.

12. The process of claim 11, wherein R represents an alkyl group having between about 5 and 10 carbon atoms.

13. The process of claim 12, wherein the hydroxyiminoketone reactant is a mixture of 1-(4-dodecylphenyl)-2-hydroxyimino-1-octanones.

14. The process of claim 1, wherein the hydroxyiminoketone reactant is formed in situ.

* * * * *